United States Patent
Bolshinsky et al.

(10) Patent No.: US 9,712,444 B1
(45) Date of Patent: *Jul. 18, 2017

(54) QUALITY OF SERVICE FOR HIGH NETWORK TRAFFIC EVENTS

(71) Applicant: International Business Machines Corporation, Armonk, NY (US)

(72) Inventors: Leonid Bolshinsky, Karmiel (IL); Vladimir Gamaley, Rehovot (IL); Sharon Krisher, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/414,773

(22) Filed: Jan. 25, 2017

Related U.S. Application Data

(63) Continuation of application No. 15/146,916, filed on May 5, 2016.

(51) Int. Cl.
| | |
|---|---|
| *G06F 15/16* | (2006.01) |
| *H04L 12/801* | (2013.01) |
| *H04L 29/08* | (2006.01) |
| *H04L 12/26* | (2006.01) |
| *H04L 12/851* | (2013.01) |
| *H04L 12/24* | (2006.01) |

(52) U.S. Cl.
CPC ............. *H04L 47/12* (2013.01); *H04L 41/50* (2013.01); *H04L 41/5022* (2013.01); *H04L 43/0882* (2013.01); *H04L 47/10* (2013.01); *H04L 47/2441* (2013.01); *H04L 67/306* (2013.01)

(58) Field of Classification Search
CPC .. H04L 12/1485; H04L 41/50–41/5035; H04L 41/5067–41/507; H04L 47/10–47/122; H04L 47/22; H04L 47/24–47/25; H04L 67/322

See application file for complete search history.

(56) References Cited

U.S. PATENT DOCUMENTS

| | | | |
|---|---|---|---|
| 8,750,123 | B1 | 6/2014 | Alisawi |
| 8,942,128 | B2 | 1/2015 | Gusavac et al. |
| 9,055,385 | B1 | 6/2015 | Singh et al. |
| 9,178,631 | B2 | 11/2015 | Cottrell et al. |

(Continued)

OTHER PUBLICATIONS

Bolshinsky et al., "Quality of Service for High Network Traffic Events", U.S. Appl. 15/146,916, filed May 5, 2016, 28 pages.

(Continued)

*Primary Examiner* — Brendan Higa
(74) *Attorney, Agent, or Firm* — James H. Mayfield

(57) ABSTRACT

A method for providing quality of service includes identifying a high network traffic event at a node, providing a user score to each user account of a plurality of user accounts, wherein the plurality of user accounts corresponds to a plurality of user devices connected to the node, and responsive to identifying the high network traffic event, providing instructions to a subset of user devices of the plurality of user devices, wherein the instructions instruct the subset of devices to enter a low traffic mode, and wherein each device of the subset of devices corresponds to a user account with a user score below a threshold. A computer program product and computer system corresponding to the above method are also disclosed herein.

1 Claim, 4 Drawing Sheets

(56) References Cited

U.S. PATENT DOCUMENTS

| | | | |
|---|---|---|---|
| 9,292,400 B1* | 3/2016 | Rapaport | G06F 11/30 |
| 2004/0003117 A1 | 1/2004 | McCoy et al. | |
| 2004/0264375 A1 | 12/2004 | Kim | |
| 2005/0002453 A1 | 1/2005 | Chang et al. | |
| 2005/0025136 A1* | 2/2005 | Anschutz | H04L 65/80 370/352 |
| 2005/0210515 A1 | 9/2005 | Roh et al. | |
| 2008/0070209 A1 | 3/2008 | Zhuang et al. | |
| 2009/0063254 A1 | 3/2009 | Paul et al. | |
| 2011/0296004 A1* | 12/2011 | Swahar | G06F 17/3053 709/224 |
| 2013/0322268 A1* | 12/2013 | Shaw | H04L 41/5029 370/252 |
| 2015/0012584 A1* | 1/2015 | Lo | H04L 67/2814 709/203 |

OTHER PUBLICATIONS

IBM Appendix P, list of patents and patent applications treated as related, Jan. 23, 2017, 2 pages.

* cited by examiner

QUALITY OF SERVICE FOR HIGH NETWORK TRAFFIC EVENTS

BACKGROUND OF THE INVENTION

The present invention relates generally to quality of service, and more specifically, to quality of service for high network traffic events. Quality of service may refer to the overall performance of a network, particularly the performance seen by end users of the network. One reason for quality of service is to ensure that the aspects of a connection, such as service response time, loss, signal-to-noise ratio, and the like meet a minimum threshold of functionality. One challenge is meeting quality of service objectives during times when a network is experiencing particularly high network traffic.

SUMMARY

As disclosed herein, a method for providing quality of service includes identifying a high network traffic event at a node, providing a user score to each user account of a plurality of user accounts, wherein the plurality of user accounts corresponds to a plurality of user devices connected to the node, and responsive to identifying the high network traffic event, providing instructions to a subset of user devices of the plurality of user devices, wherein the instructions instruct the subset of devices to enter a low traffic mode, and wherein each device of the subset of devices corresponds to a user account with a user score below a threshold. A computer program product and computer system corresponding to the above method are also disclosed herein.

DETAILED DESCRIPTION

Embodiments of the present invention relate generally to quality of service, and more specifically, to quality of service for high network traffic events. A high network traffic event may occur when the collective traffic of users creates a bottleneck at a communication node, such as an access point, router, or cellular site. Various quality of service strategies may be implemented to address the bottleneck. For example, some traffic may be deemed more important than other traffic, and thus may be granted a higher priority. One way of addressing high network traffic events is to identify users by popularity, and grant higher priority to the traffic associated with the more popular users.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
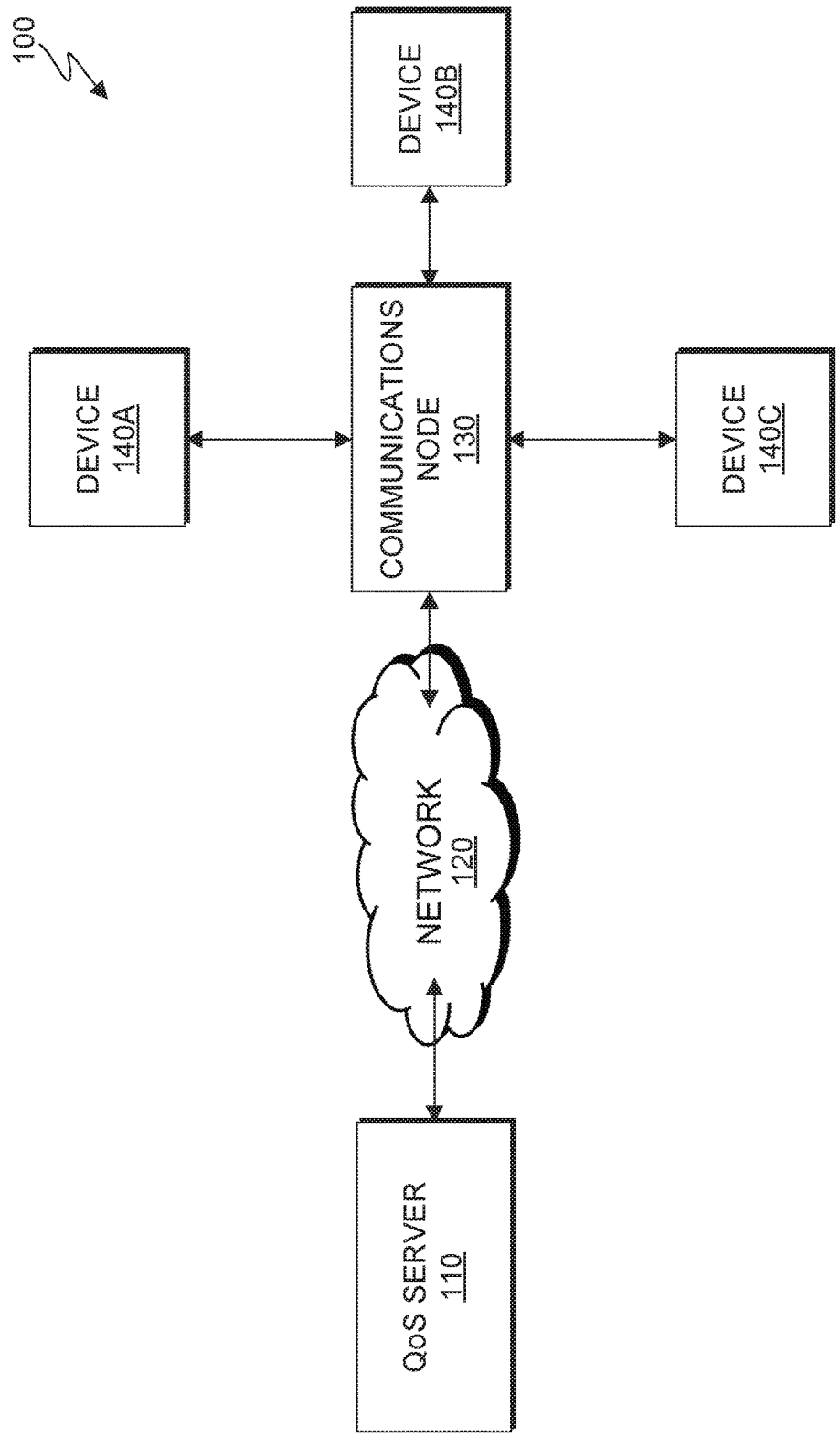
FIG. 1 is a block diagram depicting one embodiment of a quality of service (QoS) environment in accordance with the present invention.

FIG. 1 is a block diagram depicting one embodiment of a Quality of Service (QoS) environment 100 in accordance with the present invention. As depicted, QoS environment 100 includes a QoS server 110, network 120, communications node 130, and devices 140A-140C. The QoS server 110 may receive information from devices 140A-140C regarding high network traffic events, and adjust the quality of service instructions accordingly.

QoS server 110 may include a server that is tasked with the administration of quality of service implementations for users in QoS environment 100. In some embodiments, QoS server 110 receives information relating to the quality of service experienced by users of devices 140A-140C. QoS server 110 may detect or predict high network traffic events as experienced by devices 140A-140C and/or communications node 130. In response to detecting a high network traffic event, QoS server 110 may implement traffic mitigation policies for devices 140A-140C until QoS server 110 determines that the high network traffic event is over.

Network 120 may include any sort of network, such as a local area network, wireless network, intranet, or the Internet. In some embodiments, network 120 facilitates communication between QoS server 110 and devices 140A-140C via communication node 130.

Communications node 130 may include any point of access through which a device 140 may access network 120. Communications node 130 may include any sort of router, and may be accessed by devices via a wired, wireless, or fiber optic connection. In some embodiments, communications node 130 is a cellular site and devices 140A-140C connect to communications node 130 via a cellular signal.

Devices 140A-140C may include laptops, desktops, smartphones, tablets, phablets, and the like, which are capable of connecting to communications node 130. In some embodiments, devices 140A-140C are mobile devices. A high network traffic event may occur when the cumulative traffic from devices 140A-140C that passes through communications node 130 reaches a critical threshold. When a high network traffic event occurs, QoS server 110 may instruct devices 140A-140C to enter a low traffic mode for the duration of the high network traffic event.

Figure 2:
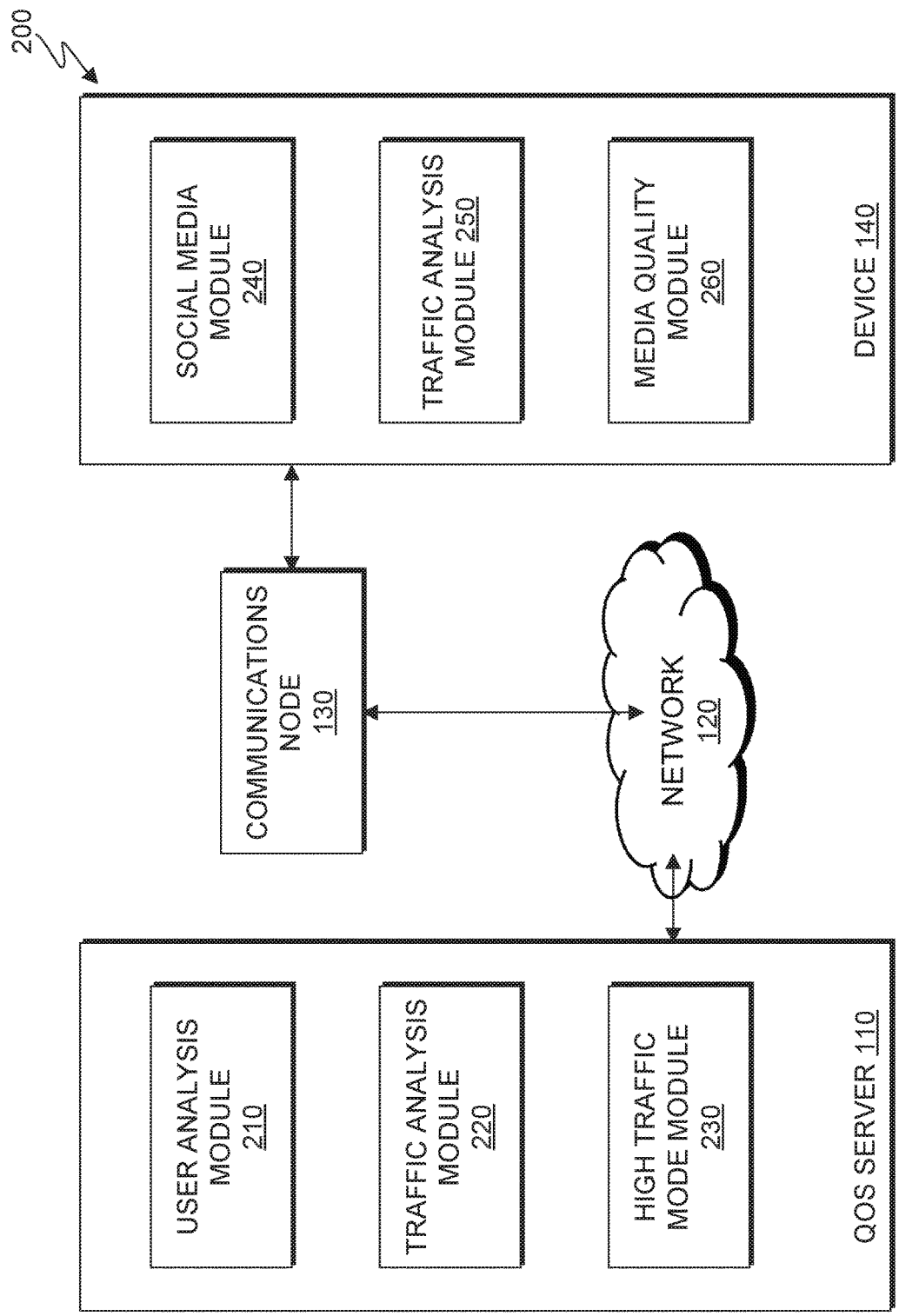
FIG. 2 is a block diagram depicting one embodiment of a QoS environment in accordance with the present invention.

FIG. 2 is a block diagram depicting one embodiment of a QoS environment 200 in accordance with the present invention. As depicted, QoS environment 200 includes QoS server 110 with user analysis module 210, traffic analysis module 220, and high traffic mode module 230, as well as device 140 with social media module 240, traffic analysis module 250, and media quality module 260. Only one user device 140 is singled out in this depiction for the sake of clarity.

QoS server 110 may include user analysis module 210, traffic analysis module 220, and high traffic mode module 230. QoS server 110 and its modules may send and receive information with device 140 and its modules. User analysis module 210 may analyze information corresponding to a user of device 140. In some embodiments, user analysis module 210 gathers information from devices connected to communications node 130 in order to rank users based on popularity of the user. In some embodiments, user analysis module 210 ranks users by popularity based on information obtained from the social media module 240 on each user's device 140.

User analysis module 210 may also score users based on information obtained from a social media network. A user account's user score may be determined based on user popularity, the number of friends or follows that the user has, or the number of friends of friends, etc. A user's user score may be determined by an aggregate user score of all of the user's friends, which is calculated based on the popularity of the user's friends/followers (e.g., a user's user score may be influenced by the user's friends' user scores). In some embodiments, each user score is determined by the user's rating, which may be calculated based on how other users rate the user (e.g., on a scale of 1-10) and/or the user's ratio of up-votes/likes to down-votes/dislikes. Thus, a user score may be calculated based on any qualitative or quantitative information regarding the user's social media content, activity, and/or relationships. Each user score may be determined based on any other basis that is known to one skilled in the art, such as how active a user is on social media, whether the user is a celebrity, VIP, administrator, or moderator, and the like.

Traffic analysis modules 220 and 250 may analyze traffic through the network 120 and communications node 130 in order to determine when a high network traffic event is occurring or is incipient. In some embodiments, traffic analysis occurs server-side on the traffic analysis module 220. In other embodiments, traffic analysis is performed client-side on the traffic analysis module 250. Traffic analysis modules 220 and 250 may function in tandem, thus sharing the traffic analysis load, with traffic analysis module 220 analyzing some traffic data and traffic analysis module 250 analyzing other data. In some embodiments, the traffic analysis module 250 of each user's device 140 on a communications node 130 gathers and sends quality of service information to the traffic analysis module 220 on the QoS server 110 for analysis. Quality of service information may include information regarding ping, latency, throughput, packet loss, DNS lookup time, and any other information relevant to determining quality of service. Upon determining that a high network traffic event is impacting quality of service and causing a bottleneck at communications node 130, traffic analysis modules 220 and/or 250 may inform high traffic mode module 230.

High traffic mode module 230 may implement various traffic mitigation techniques in order to restore a desirable quality of service level to the devices connected to communications node 130. High traffic mode module 230 may send instructions to social media module 240 to enter a low traffic mode, at which point, social media module 240 transmits and receives media at a lower resolution. In some embodiments, high traffic mode module 230 instructs media quality module 260 to reduce the quality of media (e.g., resolution of images and video) being sent and/or received by device 140 in order to conserve bandwidth.

Social media module 240 may include an application running on device 140 associated with a social media network. The social media network may include any sort of network where users can share media and text with other members of the social media network. In some embodiments, social media module 240 facilitates the prediction of a high network traffic event at communications node 130. For example, if many users RSVP to an event on social media module 240 of their devices 140, then QoS server 110 can determine that many users will be at the same place at the same time. Thus, QoS server 110 can anticipate that communications node 130 may become overwhelmed with traffic from the attending users' devices at that given time. In some embodiments, the functionality of traffic analysis module 250 is incorporated into social media module 240 such that social media module 240 is responsible for identifying high network traffic events.

Media quality module 260 may implement instructions received from QoS server 110 to temporarily modify the quality of media transferred to and from device 140. For example, due a high network traffic event, device 140 receives instructions from QoS server 110 to enter low traffic mode. While in low traffic mode, media quality module 260 may reduce the quality of media transferred to and from social media module 240. Media quality module 260 may mitigate traffic by implementing lossy or lossless compression algorithms. In some embodiments, social media module 240 and/or media quality module 260 extend the traffic mitigation effect of low traffic mode to other aspects of the device 140, such as MMS messaging, web browsing, or any media transfer in general. Thus, while a high network traffic event is impacting a communications node 130, a user's device may send and receive media whose quality has been reduced (as compared to its native quality).

Figure 3:
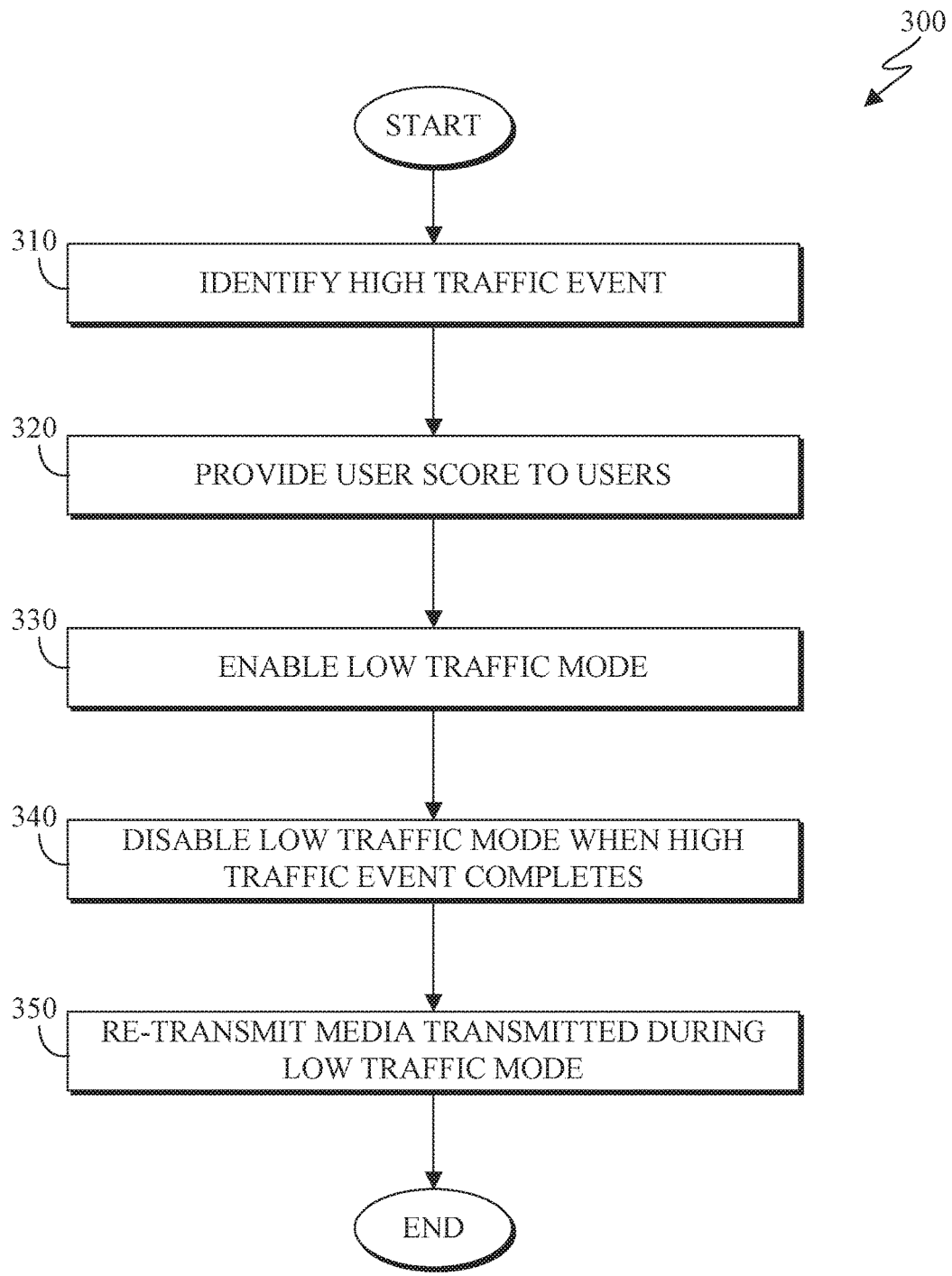
FIG. 3 is a flow chart depicting one embodiment of a traffic mitigation method in accordance with the present invention.

FIG. 3 is a flow chart depicting one embodiment of a traffic mitigation method 300 in accordance with the present invention. As depicted, traffic mitigation method 300 includes identifying (310) a high network traffic event, providing (320) a user score to user accounts, enabling (330) low traffic mode, disabling (340) low traffic mode, and re-transmitting (350) media. The traffic mitigation method 300 enables quality of service to be preserved during a high network traffic event by favoring select users' traffic over others.

Identifying (310) a high network traffic event may include determining that a high network traffic event is taking place, or is about to take place. A high network traffic event may be any event that impacts the quality of service of mobile users. For example, when many users attempt to browse content on their mobile devices at the same time and place, communications nodes 130 to which their mobile devices are connected may become overwhelmed. High network traffic events may tend to occur on cellular networks when many devices are in close geographical proximity, as the users' devices will likely be using the same communication node(s) 130 at the same time. Emergencies or newsworthy events may also lead to high network traffic events. The occurrence of a high network traffic event may be determined by traffic analysis performed by social media module 250, traffic analysis module 220 on QoS server 110 and/or by traffic analysis module 250 on each device 140.

High traffic events may also be predicted ahead of time. For example, when social media users RSVP to any sort of event, traffic analysis module 220 may anticipate that many devices will be gathered in a small area. In some embodiments, in response to detecting that users have added an event to their calendar, traffic analysis module 220 passes along to high traffic mode module 230 information regarding the incipient high traffic event. By determining that a high traffic event is incipient, aspects of the traffic mitigation method 300 can be implemented ahead of time in order to further mitigate any expected impacts to quality of service.

Providing (320) user score to user accounts may include scoring each user account based on the user's account activity on a social media network. User accounts may be scored according to popularity by user analysis module 210. User scores may be updated frequently in response to any user account activity on a social media network.

Enabling (330) low traffic mode may include activating low traffic mode on each user device 140 belonging to a user whose user score is below a threshold score. Since user score may be correlated to popularity, this means that users whose accounts have low user scores may tend to have their devices enter low traffic mode, while users whose accounts have high user scores may not have their devices be subject to the low traffic mode. In some embodiments, the threshold score is calculated to minimize the number of devices 140 that enter low traffic mode, while maximizing the number of devices that do not. Devices may be directly correlated with user score for purposes of ranking devices 140, as one user is logged in per device 140 via social media module 240.

During a high network traffic event, network resources may be allocated according to the popularity of each user, with the more popular users receiving more of the network resources. For example, if there are one hundred devices connected to a communications node 130 and a high network traffic event takes place, high traffic mode module 230 may determine that, by placing the bottommost 25% of devices (as ranked by user score) into low traffic mode, the quality of service for users of the remaining 75% of devices may return to acceptable levels. The high traffic mode module 230 may also determine tiered degrees of low traffic modes, with some user devices experiencing more (or less) of an impact to their quality of service relative to other user devices. In some embodiments, devices associated with whitelisted user accounts may be specifically exempted from low traffic mode altogether. For example, accounts belonging to especially popular users (such as celebrities), and administrators and moderators of the social media network may be exempted from low traffic mode even though the high traffic mode module 230 would otherwise instruct their devices 140 to enter low traffic mode. Thus, the traffic mitigation method 300 may seek to mitigate a high network traffic event by triaging user devices according to user score, with the most popular user accounts experiencing little or no reduction in quality of service.

While in low traffic mode, each device's media quality module 260 may compress or lower the resolution of video and images sent and/or received by device 140. For example, if a user attempts to send a 4 megabyte image from the user's device, low traffic mode may reduce the image to a smaller, lower-quality image of 1 megabyte in order to conserve bandwidth. Similarly, devices in low traffic mode may receive media at a lowered resolution/quality. The quality of video streaming to/from devices may also be lowered while the device is in low traffic mode. In some embodiments, low resolution mode applies to a social media application installed on a user's device, whereas in other embodiments, low resolution mode applies to other applications, such as a device's default MMS and email applications, and third party media applications.

Disabling (340) low traffic mode may include determining that the high network traffic event has completed and in response, sending instructions to the devices subject to the low traffic mode to disable low traffic mode. Once low traffic mode is disabled on the devices, users of the devices may experience a quality of service that is comparable to the quality of service experienced prior to the high network traffic event. Low traffic mode may also be disabled on a device 140 if the device 140 switches to a different communications node 130 which is not experiencing a high network traffic event.

Re-transmitting (350) media transmitted during the low traffic mode may include re-transmitting some or all of the media that a device 140 previously sent or received while in low traffic mode. Thus, if a user downloaded a picture whose resolution was lowered due to the device 140 being in low traffic mode at the time, social media module 240 will re-transmit the picture at a superior resolution when the device 140 exits low traffic mode. In some embodiments, the higher resolution media will replace the lower resolution media on device 140.

Figure 4:
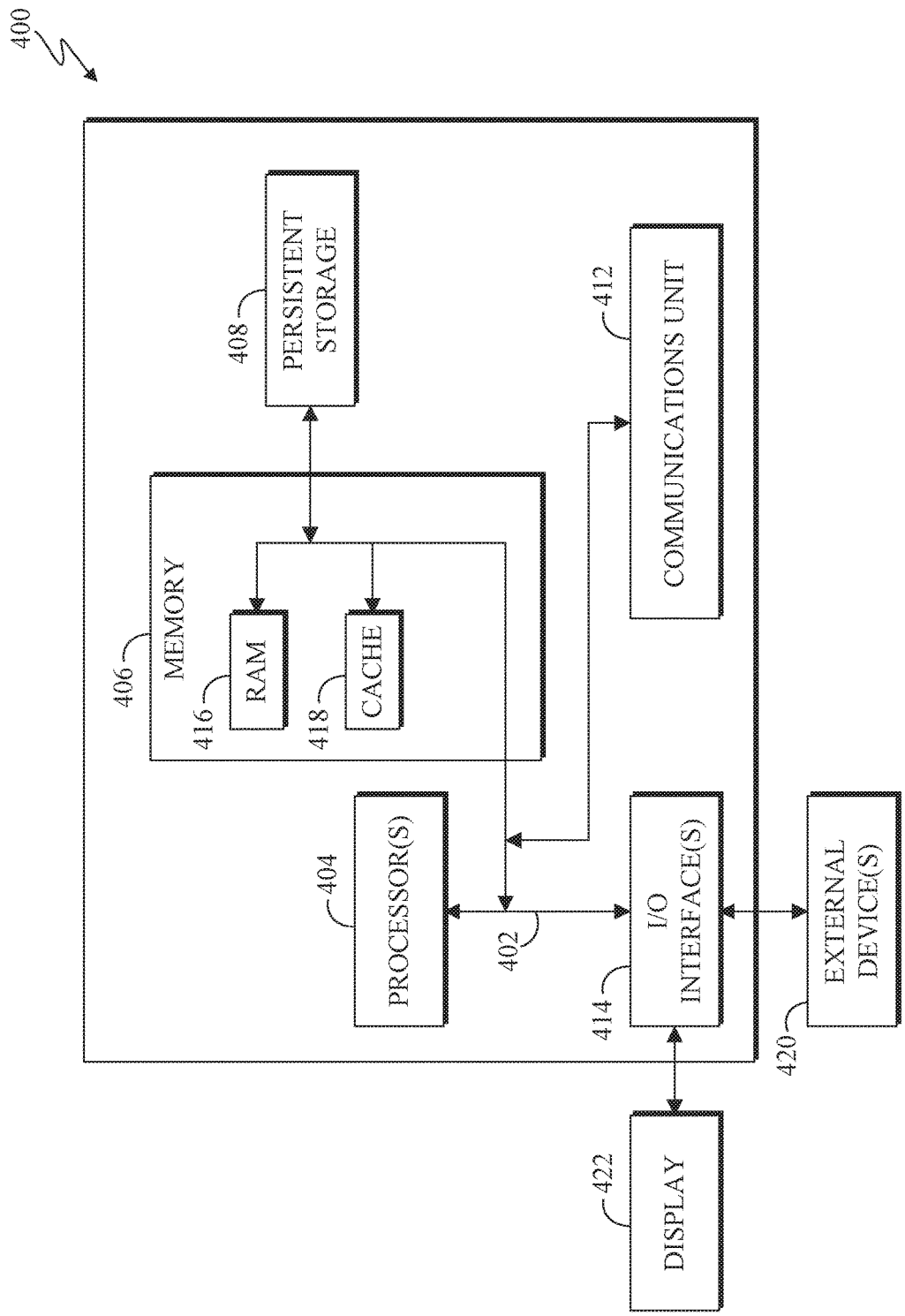
FIG. 4 is a block diagram depicting one example of a computing apparatus (i.e., computer) suitable for executing the methods disclosed herein.

FIG. 4 is a block diagram depicting components of a computer 400 suitable for executing the methods disclosed herein. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for providing quality of service, the method comprising:

identifying a high network traffic event at a node;

providing a user score to each user account of a plurality of user accounts, wherein the plurality of user accounts corresponds to a plurality of user devices connected to the node, wherein the high network traffic event is identified by receiving quality of service information from the plurality of user devices;

responsive to identifying the high network traffic event, providing instructions to a subset of user devices of the plurality of user devices, wherein the instructions comprise instructions for the subset of devices to enter a low traffic mode, wherein the devices in low traffic mode send and receive media in a resolution that is lower than devices not subject to the low traffic mode, wherein each device of the subset of devices corresponds to a user account with a user score below a threshold, wherein the user score is calculated for each user based on one or more of the user's number of friends, an aggregate user score of all of the user's friends, and the user's rating, and wherein the low traffic mode lowers the resolution of media to a degree corresponding to the user score of each device's user, wherein a lower user score corresponds to a greater lowering of resolution;

identifying that the high network traffic event has completed;

disabling the low traffic mode for devices corresponding to the subset of the plurality of users; and retransmitting the media that was sent and received from each user's device during low traffic mode.

* * * * *